July 24, 1923.
W. B. SCHULTE
POSITION INDICATOR
Filed Oct. 6, 1921
1,462,664
Fig. 1,
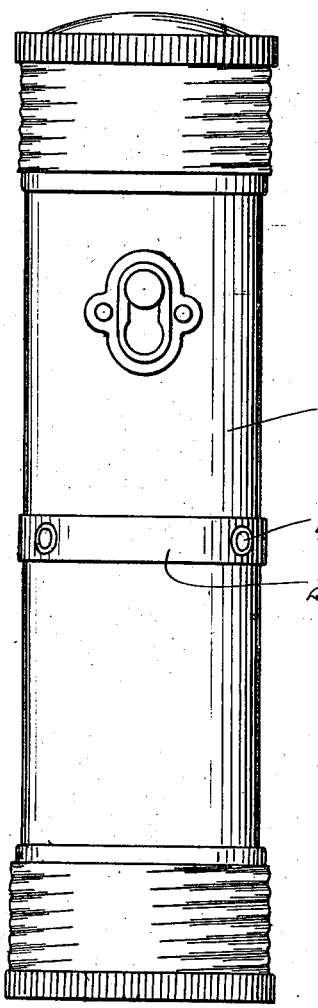
Fig. 2,
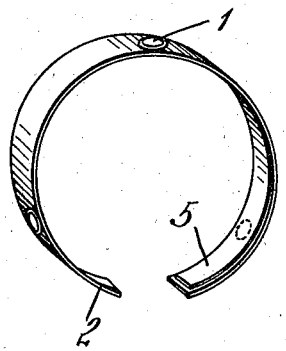
Fig. 3,
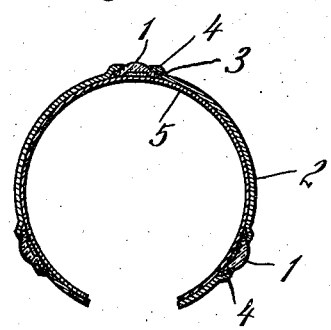
Fig. 4.
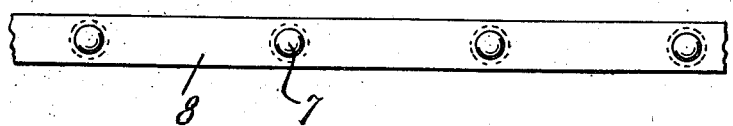
Inventor
Walter B. Schulte
By his Attorneys
Pennie Davis Marvin Edmonds Patented July 24, 1923.

1,462,664

UNITED STATES PATENT OFFICE.

WALTER B. SCHULTE, OF MADISON, WISCONSIN, ASSIGNOR TO BURGESS BATTERY COMPANY, A CORPORATION OF WISCONSIN.

POSITION INDICATOR.

Application filed October 6, 1921. Serial No. 505,701.

*To all whom it may concern:*

Be it known that I, WALTER B. SCHULTE, a citizen of the United States, residing at Madison, in the county of Dane, State of Wisconsin, have invented certain new and useful Improvements in Position Indicators; and I do hereby declare the following to be a full, clear, and exact description of the invention, such as will enable others skilled in the art to which it appertains, to make and use the same.

My invention is an improvement in means for attaching position indicators to portable articles, as for instance, electrical hand lamps, that are designed to be used in the absence of light, or which are stored in dark places. Such articles are difficult to find, and it is desirable that they be provided with position indicators, as for instance, markers with luminous paint. The object of the present invention is to provide a means for easily and quickly attaching position indicators, as for instance, luminous spots, to articles of the character in question.

In the drawings, Fig. 1 is an elevation of a hand lamp provided with the position indicators. Fig. 2 is a perspective view of the attaching means for the indicators. Fig. 3 is the longitudinal section of the same. Fig. 4 is a plan view of another embodiment of the invention.

In the embodiment of the invention shown in Figs. 1, 2 and 3, the luminous spots, which are in the form of beads 1, back with a luminous compound of any desirable character, are supported by a split band 2 of resilient material, as for instance steel, which is preferably nickel plated to provide an ornamental finish. The band has at spaced intervals, openings 3, each of which is surrounded by an embossed beading 4, and the beads 1 are set in the openings. The openings are of a size such that the beads will not pass through the same, that is, the openings are of less diameter than the beads, and the beads fit within the embossed edges of the openings. The beads are held in place by a strip of cloth 5, as for instance tape, and the tape may be connected to the band in any suitable or desirable manner. In the present instance, the tape is adhesive tape, and is held to the band by the adhesive.

In use the band or strips are made of suitable diameter to fit about the article, and they may be slipped over the article and will be held in place by their resiliency. In the present instance the strip is shown attached to an electrical hand lamp 6, being slipped upon the lamp and held by the resiliency of the material of the strip. In the form just described, the strip or band must be made of approximately the same diameter as the article upon which they are to be used, and will be of various sizes. As for instance, a hand lamp will require one size, and a fishing rod another size. In the embodiment of the invention shown in Fig. 4, the beads 7 are backed with a luminous compound, and are supported by a strip 8 of suitable material, as for instance cloth, paper or the like, and they are held upon the strip in any suitable manner. When it is desired to place indicators upon an article, a sufficient length of the strip is cut off, and wrapped about the article, being secured thereto in any suitable manner. In the embodiment of the invention shown in Fig. 1, three beads are provided, so spaced that whatever the position of the lamp, one of the beads will be exposed, so that the location of the lamp may be ascertained at a glance, and preferably the clip when made for special articles will be arranged in a similar manner, that is, each clip having three or more beads.

I claim:

1. Means for attaching position indicators to articles, comprising a strip of flexible resilient material shaped into the form of a split band for clasping the article, and provided with translucent beads having backings of luminous materials, said beads being set in openings in the strip of material, the openings being of smaller diameter than the beads.

2. Means for attaching position indicators to articles, comprising a split band of resilient material having a plurality of openings therein and adapted to be slipped about the article, beads held in the openings, said beads having backings of luminous material, and means covering the backs of said beads for holding them in position in the openings.

3. Means for attaching position indicators to articles, comprising a split band of resilient material adapted to be slipped about the article, and having openings and translucent luminous beads held in the openings, the material of the band being embossed about the openings to receive the beads and a strip of flexible material secured to the inner face of the band to hold the beads in place.

In testimony whereof I affix my signature.

WALTER B. SCHULTE.